Feb. 28, 1961   R. L. BATES ET AL   2,973,214
FABRICATION AND DESIGN OF SHAFTS AND SPLINES
Filed Feb. 10, 1959

INVENTOR.
Richard L. Bates
Ralph G. Zaginailoff
BY
*Arthur L. Collins*
ATTORNEY

United States Patent Office 2,973,214
Patented Feb. 28, 1961

2,973,214

FABRICATION AND DESIGN OF SHAFTS AND SPLINES

Richard L. Bates, Beverly, and Ralph G. Zaginailoff, Melrose, Mass., assignors, by mesne assignments, to the United States of America as represented by the Secretary of the Navy Filed Feb. 10, 1959, Ser. No. 792,452

2 Claims. (Cl. 287—126)

This invention relates to means for joining aligned shafts in torque transmitting relationship. Considerable difficulty has been encountered heretofore with connections, such as bolted flanges, that are used to join a shaft from a test apparatus to a shaft of an aircraft fuel control device as required in testing the device for frequency response. Expansions due to temperature changes and variations due to tolerance stack-up cause an axial loading of one or more of the rotary members in the case of the bolted flange. Whereas, with the spline connection it is extremely difficult to machine the metal parts to be joined, without entailing excessive costs, so as to eliminate backlash. In either case, the presence of backlash or axial loading of coupled shafts results in inaccurate results.

It is, accordingly, the object of this invention to provide an improved means for joining rotating shafts which eliminates both backlash and axial loading.

It is a further object of this invention to provide a shaft connection which is reliable and accommodates slight misalignment of the shafts.

Another object of the invention is to provide an improved drive connection utilizing resilient means designed to permit joining slightly misaligned shafts, avoiding backlash and providing for axial float.

Other objects of the invention will be readily apparent upon reading the following detailed description when considered with the accompanying drawings.

In the drawings, Fig. 1 shows a longitudinal section of the coupled shafts;

Fig. 2 is a cross section of the coupled shafts taken on the line 2—2 of Fig. 1;

Fig. 3 shows the shaft members uncoupled and in perspective;

Fig. 4 is a perspective view of the shank modified.

In a general way, the invention is a modified mortise and tenon. It is characterized in the drawings by the numeral 10 and comprises a shank 11, which is like a tenon in appearance, and a socket 13, that is on the order of a mortise. The shank and socket are end portions of metallic shafts 12 and 14. For purposes of distinguishing them, the member 14 may be referred to as a rod and either of them, 12 or 14, may be the driving or the driven member. It is immaterial for the purposes of the invention as to which is the driving or driven member.

The recess 15 (Fig. 3) in the socket is defined by four flat surfaces or flats, one of which is identified at 16, and is square in cross section. The depth of the recess is preferably greater than the shank length.

The shank 11 is shown to have four rectangular surfaces or flats, as the one numbered 17 (Fig. 3), juxtaposed around its periphery and is square in cross section. The cross-sectional dimensions of the shank are normally larger than that of the recess 15 in socket 13. Thus, in Fig. 3, $1_r$ is larger than $1_s$.

There is a transverse slit 18 (Fig. 1) in the shank 11 that extends longitudinally along a plane passing through a diagonal of the cross-sectional square (Fig. 2). This divides the shank into two projections or spring fingers, 19 and 20. These are in effect wedges having their bases 21 and 22 facing each other at a spaced distance and their edges 23 and 24 directed radially away from each other. The slit has an axial length which provides the projections 19 and 20 with resilience so that they may be brought together on a portion of their bases by a predetermined radially inwardly directed force and thus decrease the cross-sectional dimensions of the shank, at least at the extreme end portion. In a quarter inch shaft a slit .050 inch wide extending axially about an inch or more was found to provide the desired results.

A compressible, resilient material 25 such as the synthetic rubber known in the trade as neoprene or some other suitable resilient material, fills the slit 18. It is preferred that the material be firmly engaged in the slit as by molding it to the bases of the projections 19 and 20. The material 25 exerts a radially outward pressure on the projections 19 and 20 so that the shank is urged to maintain its normal size.

To provide for the expansion of the resilient material resulting in coupling the shank with the socket, the edges of the resilient material are removed so as to form minor resilient flats, 26 (Fig. 3).

In a like manner, it may be desirable to remove the metallic edges and form minor metallic flats, 30 (Fig. 4). A shank with the metallic and resilient edges removed is shown in Fig. 4. This modification was found to provide considerable coupling ease.

In coupling the shank 11 with the socket 13, the projections 19 and 20 are moved radially inward in some known manner, as by a clamp, if desired. The material 25 is thereby compressed and the shank end reduced sufficiently for its introduction into the socket, if there is slightly misalignment of the shafts. The clearances 26 and 27 (Fig. 1) are left at the ends of the shank and socket and then the pressure on the projections 19 and 20 is released. The resilient material forces the edges 23 and 24 on the projections (Fig. 2) into the corners of the recess 15. It is apparent that all major flat surfaces, no less, on the shank 11 will engage those in the socket, frictionally joining the shafts with metal to metal contact. The shafts may then be rotated in any direction with equal facility and without backlash. The clearances 26 and 27 at the ends of the socket and shank along with the absence of restraint against axial movement of the shafts accommodate them for axial float. This, of course, is only to the extent of the shank length. The connection is readily releasable, since it requires no more than an axial outward pull to do so.

It is apparent that the position of the slit 25 in the shank member—diagonally across the cross-sectional square and through joints between flats—makes it possible to connect a normally oversize shank with a socket. In effect, the formation of the slit removes metal from all sides of the shank which is then replaced with resilient material. When the projections 19 and 20 of the shank are pressed inward the square cross section of the shank is reduced, but it retains its square shape.

The construction of the shank and the presence of the resilient member, furthermore, somewhat cushions the shock to which most running machinery is subject to, smoothing out the load for both drive and driven members.

Obviously many modifications and variations are possible without departing from the essence of the invention. It is therefore to be understood that the scope of the invention is defined by the appended claims otherwise than as specifically described.

What is claimed is:

1. A rotatable flexible connection for joining two fixed shafts together comprising a shaft member having a socket with a recess, a rod member having a shank to be received in said socket recess so as to avoid backlash while permitting slight misalignment of said members, said socket recess and shank having similar non-circular cross-sectional configurations defined by a plurality of flats, the cross-section of said shank being slightly larger than that of said recess and the depth of said recess exceeding the length of said shank to permit some axial movement therebetween without disconnection, said shank having a longitudinal slit transversely penetrating said shank at joints between flats forming said shank into spring projections to permit radial compression of said shank for introduction into said socket recess the other joints between flats being chamfered forming minor flats therebetween, and a resilient member disposed in said slit for urging said spring projections outwardly.

2. The connection of claim 1 wherein the cross-section of said shank and socket recess are squares and said slit passes through a diagonal of the shank.

References Cited in the file of this patent
UNITED STATES PATENTS

| | | |
|---|---|---|
| 324,450 | Andrews | Aug. 18, 1885 |
| 1,164,801 | Frazier | Dec. 21, 1915 |
| 1,365,071 | Abegg | Jan. 11, 1921 |
| 1,695,411 | Busch | Dec. 18, 1928 |
| 1,845,677 | Mekeel | Feb. 16, 1932 |
| 2,199,076 | LaSota | Apr. 30, 1940 |
| 2,716,822 | Launder et al. | Sept. 6, 1955 |
| 2,775,913 | Deliso | Jan. 1, 1957 |